US005341553A

United States Patent [19]

Herzhauser

[11] Patent Number: 5,341,553

[45] Date of Patent: Aug. 30, 1994

[54] IMPELLER PULLER

[76] Inventor: Ludwig Herzhauser, 8188 Aviation Blvd., Marathon, Fla. 33050

[21] Appl. No.: 126,998

[22] Filed: Sep. 24, 1993

Related U.S. Application Data

[63] Continuation-in-part of Ser. No. 28,935, Mar. 5, 1993, abandoned.

[51] Int. Cl.⁵ .................... B23P 19/04

[52] U.S. Cl. .................... 29/261

[58] Field of Search .................... 29/261, 260, 259, 258

[56] References Cited

U.S. PATENT DOCUMENTS

| | | | |
|---|---|---|---|
| 724,818 | 4/1903 | Crane | 29/261 |
| 1,041,419 | 10/1912 | Borden | 29/261 |
| 1,475,810 | 11/1923 | Frisz | 29/261 |
| 1,534,350 | 4/1925 | Bassett | 29/261 |
| 1,599,738 | 9/1926 | Atkins | 29/261 |
| 1,683,188 | 9/1928 | Howell | 29/261 |
| 2,484,129 | 10/1949 | Taylor | 29/261 |

*Primary Examiner*—Robert C. Watson
*Attorney, Agent, or Firm*—Malloy & Malloy

[57] ABSTRACT

An impeller puller to be utilized to remove flexible impellers of varying dimensions from a shaft within a liquid pump, the impeller puller including a linkage head having an axial bore, and a pair of clamp members oppositely and hingedly disposed along opposite sides of the linkage head, each of the clamp members including at least one adjustably and removably positionable gripping jaw thereon and being movable between a retracted and a clamping position such that upon the turning of the screw member disposed within said axial bore of said linkage head, the screw will contact the shaft within the liquid pump and the linkage head will move away from the shaft pulling the impeller therewith from the shaft.

4 Claims, 2 Drawing Sheets

IMPELLER PULLER

This application is a continuation-in-part to the previously filed application Ser. No. 08/028,935, filed Mar. 5, 1993, now abandoned.

BACKGROUND OF THE INVENTION

1. Field of the Invention

The present invention relates to an impeller puller adapted to facilitate the removal of flexible impellers from the body or housing of various liquid pumps without necessitating that the entire pump be replaced if only the impeller is worn or has become damaged.

2. Description of the Related Art

In various types of liquid pumps, particularly those designed for marine use, elongate flexible impellers are utilized. These impellers vary in their size and dimensions, as well as in the number of blades they include, depending on the particular model or adaptation of the liquid pump. When one of these flexible impellers must be replaced, it is often a highly time consuming and difficult procedure. Commonly, the impellers are removed utilizing a pair of flat head screwdrivers to pry the impeller from the shaft, first separating it from the shaft and then pulling it off of the shaft. In addition to being highly time-consuming, this procedure usually damages the impeller, making it unusable for later reworking, and also can often damage the pump itself. The extent of the difficulty in removing these impellers, particularly in liquid pumps having marine uses, is evident by the fact that often the entire pump itself is replaced rather than dealing with the time and complexity involved in only removing the impeller. Accordingly, a tool adapted specifically to remove these flexible impellers from liquid pumps would be highly beneficial. The impeller puller of the present invention is such a tool.

In the past, there have been patents for various types of puller implements, such as those disclosed in the patents to Frisz, U.S. Pat. No. 1,475,810, Howell, U.S. Pat. No. 1,683,188, Taylor, U.S. Pat. No. 2,484,129, Crane, U.S. Pat. No. 724,818, Bassett, U.S. Pat. No. 1,534,350, and Atkins, U.S. Pat. No. 1,599,738. These devices, which are adapted to remove wheels, gears, and bearings, all utilize standard principals of leverage with their own minor variations making their respective devices suitable for the intended use. For example, the puller implement of Frisz includes a pair of hingedly attached clamp arms, each including an overhanging lip adapted to pass behind the wheel or gear to be pulled, and including an axially disposed screw to help pry the wheel from the shaft. As such, the puller implement of Frisz is primarily adapted to be a wheel puller, the wheel or gear to be pulled generally being substantially narrow and having a somewhat smooth and continuous outer periphery such that the clamp may be disposed about the wheel at any location about its circumference. Similarly, the other referenced patented pullers also include two or three oppositely disposed clamp arms with a single distal lipped portion on each clamp arm so that the clamp arms may pass around the wheel or gear and pull it out. Such devices, however, would not be suitable for removing an impeller from a liquid pump. Principally, impellers are commonly positioned within a housing of the pump which is the same or only a slightly larger diameter than an outer diameter of the impeller defined by its various blades. As a result, the clamp must pass between the blades. This can be a particularly difficult task if the impeller is of the type which includes an odd number of blades. In such impellers, if only two oppositely disposed clamp members were utilized, a proper grip could not be obtained. Further, since the impellers are generally flexible, if only a single lip at the distal end of the clamp members were utilized, uneven pulling would result potentially causing the pulling tool to slip. Accordingly, there is still a need for pulling implement which is adapted specifically for use in removing flexible impellers from liquid pumps.

The device of the specific invention is specifically adapted to meet the needs not addressed by existing implements. It enables full and complete gripping over an elongate surface and is adaptable for facilitated use with impellers of varying dimensions and blade numbers.

SUMMARY OF THE INVENTION

The present invention is directed towards an impeller puller adapted to be used to remove flexible impellers of varying dimensions from a shaft within a liquid pump. The impeller puller includes primarily a centrally disposed linkage head. The linkage head includes an axial bore extending therethrough wherein an elongate screw member is extended. Further, at least two clamp members are disposed along opposite sides of the linkage head. The clamp members are oppositely disposed from one another and are each hingedly secured to the linkage head by a plurality of elongate link members. Particularly, at least two of the link members are hingedly disposed between the linkage head and a first of the clamp members, and at least two of the link members are hingedly disposed between the linkage head and second of the clamp members. The link members are positioned such that the first and the second clamp members are hingedly movable between a retracted and clamping position. Both the first and the second of the clamp members each include at least one gripping jaw. The gripping jaws on the clamp members each include confronting, toothed inner surfaces, there being a number of teeth along the surface so as to securely grip the flexible impeller. Adjustment means are included such that the gripping jaws can be adjustably and removably positioned on each of the clamp members. Particularly, the gripping jaws are adjusted such that the confronting toothed inner surfaces can be adjustably spaced from one another so as to accommodate impellers of varying sizes and configurations. Both of the clamp members further include an outwardly extending handle segment. The handle segments extend away from the clamp members in order to facilitate full retraction of the clamp members during attachment positioning or removal of the gripping jaws from the impeller using only one hand. The elongate screw member which extends axially through the axial bore of the linkage head is adjustably positionable such that it contacts the shaft upon which the flexible impeller is disposed. Specifically, the screw member is adapted to be inwardly screwed towards the shaft such that contact by the screw member with the shaft will result in the linkage head moving away from the shaft and accordingly the impeller gripped between the gripping jaws being pulled from the shaft.

It is a primary object of the present invention to provide an impeller puller which will facilitate the removal of flexible impellers from difficult to reach locations within a liquid pump.

Still another object of the present invention is to provide an impeller puller which is specifically adapted for use on impellers having even or odd number of blades.

Another object of the present invention is to provide an impeller puller which can effectively remove flexible items such as a flexible impeller.

Still another object of the present invention is to provide an impeller puller which is easy to manipulate and utilize.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
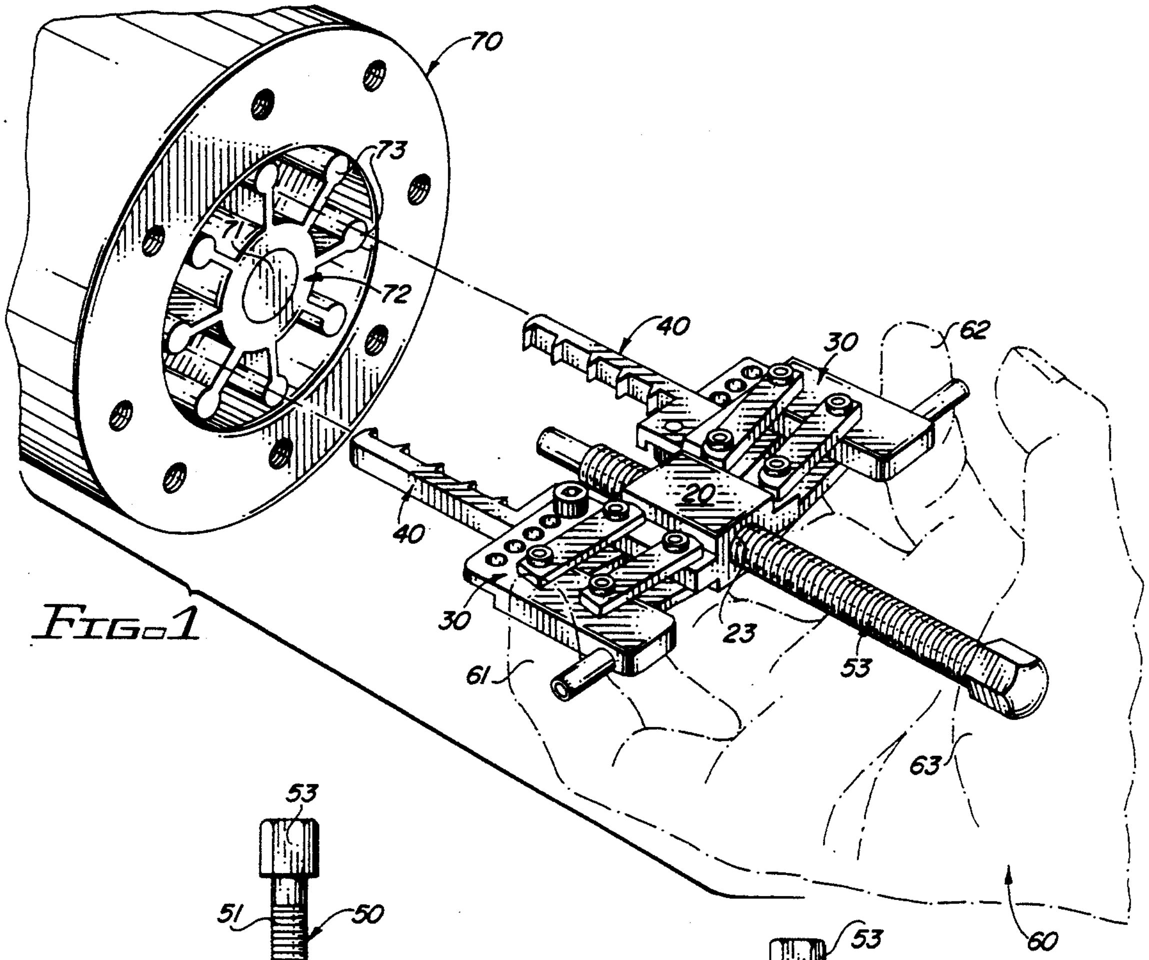
FIG. 1 is a perspective view of the impeller puller in its fully retracted orientation utilized during attachment positioning.
Figure 2:
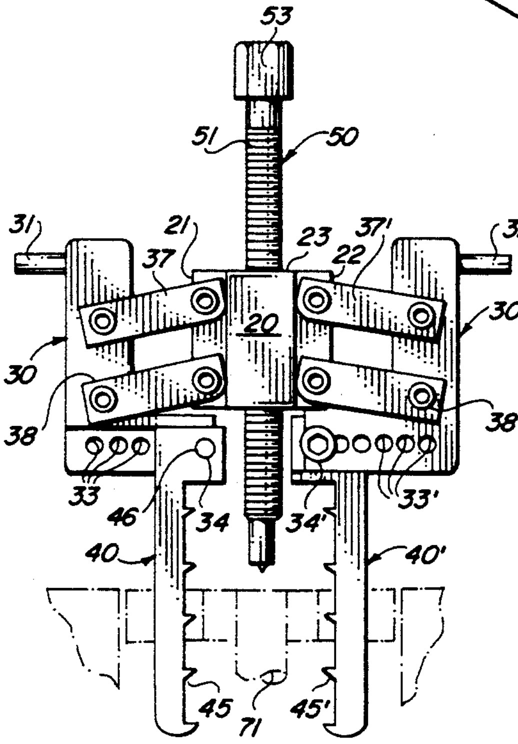
FIG. 2 is a front plan view of the impeller puller illustrating its initial positioning about an impeller.
Figure 3:
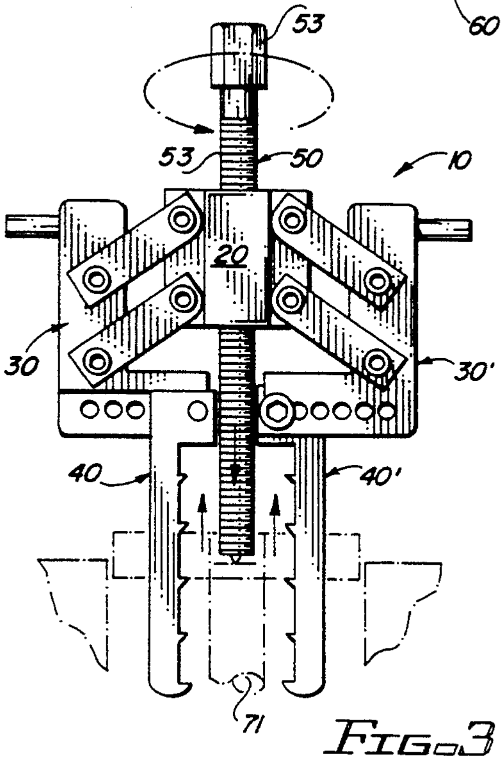
FIG. 3 is a front view of the impeller puller illustrating removal of the impeller.
Figure 4:
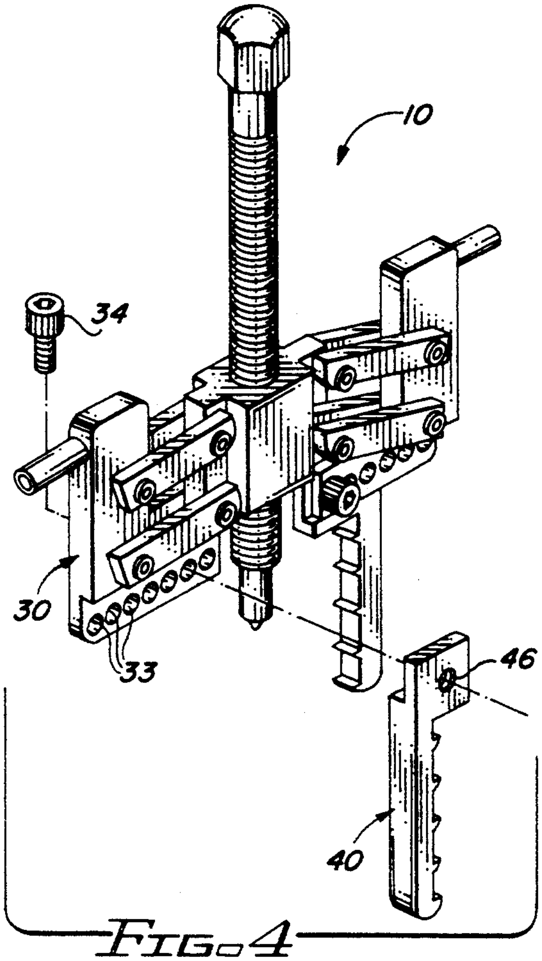
FIG. 4 is a partially exploded view of the impeller puller illustrating the adjustable positioning of the gripping jaw.
Figure 5:
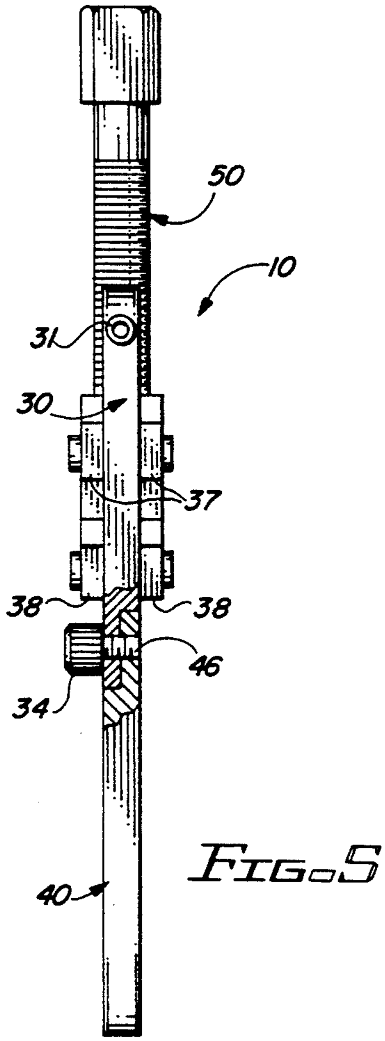
FIG. 5 is a side plan view of the impeller puller.

Shown throughout FIGS. 1-6, the present invention is directed towards an impeller puller generally indicated as 10. The impeller puller is primarily adapted to remove flexible impellers 72 of varying dimensions from a shaft 71 of a liquid pump 70. The impeller 72 is of a type which includes a varying number of blades 73 depending on the particular adaptation. The impeller pump 10 includes primarily a linkage head 20 and a pair of clamp members 30 and 30'. The linkage head 20 is generally rectangular in shape and includes a pair of opposite edges 21 and 22. Extending axially through the linkage head 20 is an axial bore 23. The axial bore 23 includes a threaded interior surface wherein an elongate screw member 50 is disposed. The pair of clamp members 30 and 30' are oppositely disposed from one another on the opposite sides 21 and 22 of the linkage head 20. Connecting the clamp members 30 and 30' to the linkage head 20 are a plurality of elongate link members 37, 37' and 38, 38'. At least two of those link members 37 and 38 are hingedly disposed between the linkage head 20 and a first of the clamp members 30. Similarly, at least two of the link members 37' and 38' are hingedly disposed between the linkage head 20 and a second of the clamp members 30'. The link members 37, 37', 38 38' can either be a single member or a pair of members, as illustrated in FIGS. 1 and 4, which sandwich the linkage head 20 and clamp members 30 and 30'. The link members 37, 37', 38 38' are adapted to enable the clamp members 30 and 30' to be hingedly movable between a retracted and a clamping position. Further, the link members may include rounded edges to facilitate hinged movement thereof.

Figure 6:
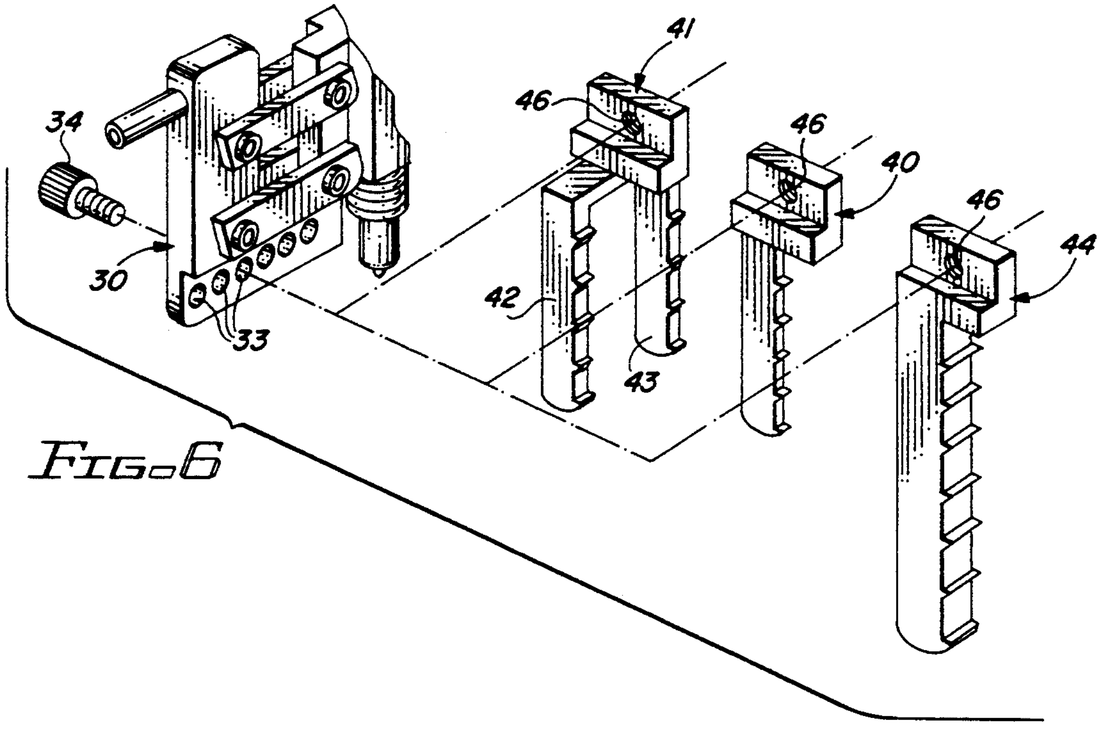
FIG. 6 is a partial, exploded view of the impeller puller illustrating varying embodiments of the gripping jaw.

Extending from each of the clamp members 30 and 30' are a pair of outwardly extending handle segments 31 and 31'. The handle segments 31 and 31' are adapted to enable the clamp members 30 and 30' to be easily and fully held in their retracted position during attachment positioning and removal of the impeller puller 10. As best illustrated in FIG. 1, the handles 31 and 31' are engaged by the pinky 61 and forefinger 62 of the user's hand while the screw member 50 abuts the heal 63 of the hand 60. Such disposition facilitates one-handed manipulation and positioning of the impeller puller 10 during use. Further included as part of each of the clamp members 30 and 30' are at least one gripping jaw 40, 40'. Each clamp member 30, 30' includes at least one of the gripping jaws 40, 40' the gripping jaws 40, 40' each including a toothed inner surface 45 confrontingly disposed relative to one another. There are a number of the teeth 45 along the inner surface such that the flexible impeller 72 may be securely gripped at a number of points when the clamp members 30, 30' are in the clamping position. Adjustment means are included to facilitate adjustable and removable positioning of the gripping jaws 40 and 40'. Particularly, each of the clamp members 30 and 30' includes a number of openings 33 and 33' therein. The openings 33 and 33' are positioned such that a single opening 46 in the gripping jaws 40 and 40' may be confrontingly positioned thereover and a screw 34, 34' passed therethrough to secure the gripping jaws 40, 40' in place on the clamp members 30 and 30'. The gripping jaws 40 and 40' are adjustably positioned so as to enable the impeller puller 10 to be utilized with impellers 72 of varying diameters. Additionally, when desired, the screw 34 and 34' may be completely removed to remove one of the gripping jaws. As illustrated in FIG. 6, the standard gripping jaw 40 may be removed and replaced with either a larger gripping jaw 44 or a specially adapted gripping jaw 41. Particularly, the specially adapted gripping jaw 41 includes two gripping jaws 42 and 43. The two gripping jaws 42 and 43 are spaced apart from one another and are particularly adapted for use on an impeller 72 having an odd number of blades 73. When an impeller 72 includes an odd number of the blades 73, the gripping jaws 40 and 40' cannot be disposed directly opposite from one another. As a result, the especially adapted gripping jaw 41 is utilized such that the two gripping jaws 42 and 43 straddle one of the blades 73 and even, balanced pressure is applied in gripping the impeller 72.

The elongate screw member 50 disposed within the axial bore 23 of the linkage head 20 includes a threaded exterior surface 51 to enable it to be adjustably screwed within the linkage head 20. Further, the screw member 50 includes a point 52 at its distal end which is adapted to contact the shaft 71 upon which the impeller 72 is positioned. The screw member 50 includes a blunt proximal end 53 such that when the gripping jaws 40, 40' are disposed in their clamped position about the impeller 72, the screw is turned at the blunt proximal end 53 so as to move the screw member 50 towards the shaft 71. After the point 52 of the screw member 50 contacts the shaft 71, further turning of the screw member results in the linkage head 20 moving away from the shaft 71. As a result, the clamp members 30 and 30' also move away from the shaft 71 resulting in the impeller 72 being pulled from the shaft 71.

Now that the invention has been described,

What is claimed is:

1. To be used to remove flexible impellers of varying dimensions from a shaft, an impeller puller comprising:

a linkage head, said linkage head including an axial bore extending therethrough, at least two clamp members, said clamp members being oppositely disposed from one another on opposite sides of said linkage head, a plurality of elongate link members, at least two of said link members being hingedly disposed between said linkage head and a first of said clamp members such that said first clamp member is hingedly movable between a retracted and a clamping position, at least two of said link members being hingedly disposed between said linkage head and a second of said clamp members such that said second clamp member is hingedly movable between a retracted and a clamping position, said first and said second clamp members each including at least one gripping jaw, said gripping jaws on each of said clamp members including confronting toothed inner surfaces structured and disposed to securely grip the impeller, adjustment means structured and disposed to adjustably and removably position said gripping jaws on said clamp members such that a length between said confronting toothed inner surfaces is varied to accommodate impellers of varying sizes and configurations, each of said clamp members including an outwardly extending handle segment structure and disposed to enable said clamp members to be easily and fully held, utilizing one hand, in said retracted position during attachment positioning and removal of said gripping jaws from the impeller, an elongate screw member extending axially through said axial bore of said linkage head, said screw member being adjustably positionable therein so as to contact the shaft upon which the flexible impeller is disposed, and said screw member being structured and disposed to be inwardly screwed towards the shaft such that contact by said screw member with the shaft will result in said linkage head moving away from the shaft and accordingly the impeller gripped between said gripping jaws being pulled from the shaft.

2. An impeller puller as recited in claim 1 wherein said adjustment means includes a plurality of openings in each of said clamp members, said openings being structured and disposed to confront a corresponding single opening disposed in each of said gripping jaws such that a screw passes therethrough securing said gripping jaws to said clamp members.

3. An impeller puller as recited in claim 2 wherein said screw member includes a pointed distal end which contacts the shaft and a blunt proximal end structured and disposed to facilitate turning of said screw member.

4. An impeller puller as recited in claim 3 wherein one of said clamp members includes two of said gripping jaws secured thereto, said two gripping jaws being spaced from one another so as to straddle a blade of the impeller, the impeller being of the kind having an odd number of the blades.

* * * * *